US008420731B2

(12) United States Patent
Cavaleiro et al.

(10) Patent No.: US 8,420,731 B2
(45) Date of Patent: Apr. 16, 2013

(54) DISPERSING AND EMULSIFYING RESINS COMPRISING POLYETHER

(75) Inventors: Pedro Cavaleiro, Viersen (DE); Eberhard Esselborn, Essen (DE); Patrick Glöckner, Haltern am See (DE); Mario Loebbus, Mülheim an der Ruhr (DE); Thomas Veit, Hagen (DE)

(73) Assignee: Evonik Goldschmidt GmbH, Essen (DE)

( * ) Notice: Subject to any disclaimer, the term of this patent is extended or adjusted under 35 U.S.C. 154(b) by 505 days.

(21) Appl. No.: 12/596,736

(22) PCT Filed: Mar. 27, 2008

(86) PCT No.: PCT/EP2008/053604
§ 371 (c)(1),
(2), (4) Date: Apr. 16, 2010

(87) PCT Pub. No.: WO2008/128846
PCT Pub. Date: Oct. 30, 2008

(65) Prior Publication Data
US 2010/0197858 A1   Aug. 5, 2010

(30) Foreign Application Priority Data
Apr. 20, 2007 (DE) .................. 10 2007 018 812

(51) Int. Cl.
*C08L 61/00* (2006.01)
(52) U.S. Cl.
USPC ........................... 524/592; 525/521; 525/522
(58) Field of Classification Search .................. 524/592; 525/521, 522
See application file for complete search history.

(56) References Cited

U.S. PATENT DOCUMENTS
4,960,840 A * 10/1990 Cotting et al. ................ 525/521

FOREIGN PATENT DOCUMENTS
| EP | 0 356 391 | | 2/1990 |
| EP | 0 555 950 | A1 | 8/1993 |
| EP | 1 078 946 | A1 | 2/2001 |
| EP | 1 167 452 | A2 | 1/2002 |

* cited by examiner

*Primary Examiner* — Vickey Nerangis
(74) *Attorney, Agent, or Firm* — Scully, Scott, Murphy & Presser, P.C.

(57) ABSTRACT

The invention relates to dispersing resins for solids which are obtainable through the partial or complete reaction of the hydroxyl groups of carbonyl-hydrogenated ketone-aldehyde resins with one or more oxiranes and, if desired, subsequent complete or partial esterification with organic and/or inorganic acids.

12 Claims, No Drawings

DISPERSING AND EMULSIFYING RESINS COMPRISING POLYETHER

The invention relates to innovative dispersing resins, to their preparation, and to their use for dispersing solids.

For the dispersing of solids (e.g., fillers, dyes or pigments) in liquid media it is regular practice to make use of dispersants in order to achieve effective dispersing of the solids, to reduce the mechanical shearing forces required for dispersing, and at the same time to realize very high degrees of filling. The dispersants assist the disruption of agglomerates, as surface-active materials they wet and/or cover the surface of the particles to be dispersed, and they stabilize these particles against unwanted reagglomeration.

In the production of paints, varnishes, printing inks, and other coating materials, dispersants facilitate the incorporation of solids, such as fillers and pigments, for example, which, as important formulating ingredients, are essential determinants of the visual appearance and of the physico-chemical properties of such systems. Optimum utilization requires firstly that these solids be distributed uniformly in the formulations and secondly that the state of distribution, once attained, be stabilized.

A host of different substances are nowadays used as dispersants for solids. In addition to very simple, low molecular mass compounds, such as lecithin, fatty acids and their salts, and alkylphenol ethoxylates, more complex, high molecular mass structures, too, are used as dispersants. Amino-functional and amido-functional systems in particular find broad use here.

U.S. Pat. No. 4,224,212, EP-B-0 208 041, WO-A-00/24503, and WO-A-01/21298, for example, describe dispersants based on polyester-modified polyamines. DE-B-197 32 251 describes polyamine salts and their use as dispersants for pigments and fillers.

The use of such products, however, also entails a multiplicity of drawbacks: When they are used in pigment pastes, high levels of dispersing additives are frequently necessary; the achievable levels of pigmentation of the pastes are unsatisfactorily low; the stability of the pastes and hence their consistency of viscosity is inadequate; and flocculation and aggregation cannot always be avoided. In many instances the pastes lack consistency of hue after storage, and lack compatibility with diverse binders. The use of known dispersing additives in many cases also adversely affects the water resistance or light stability of coating materials, and additionally it further stabilizes unwanted foam produced in the course of production and processing. In addition, owing to a lack of compatibility of the dispersing resins in numerous letdown vehicles, gloss is often undesirably affected.

There exists, consequently, a growing demand for dispersants for solids that exhibit further-improved properties as compared with the state of the art. The requirement is for dispersants which have a very high stabilizing action on a multiplicity of different solids.

With more effective dispersants, for example, it is possible to reduce the level of high-priced pigments used, without having to accept reductions in color strength.

Moreover, the viscosity characteristics of pastes, paints, varnishes, printing inks, and other coating materials comprising dyes or solids, such as fillers and/or pigments, for example, are critically codetermined by the dispersant used. The demand here is in particular for dispersants which result in a very low viscosity in the liquid paints and varnishes, and which also retain such a viscosity, preference being given to Newtonian viscosity behavior.

In the architectural paints industry, moreover, aqueous pigment pastes, containing cosolvent where appropriate, are used which are employed universally, for tinting, in aqueous emulsion paints with a straight-acrylate, styrene-acrylate or silicate basis, and also in nonpolar, long oil alkyd-based decorating paints.

Suitable more particularly for this purpose are the phosphoric esters.

Phosphoric esters and their use as dispersants are known and can be found in the prior art. U.S. Pat. No. 4,720,514, for instance, describes phosphoric esters of a series of alkylphenol ethoxylates which can be used with advantage to formulate aqueous pigment dispersions. Phosphoric esters for a similar use are described by EP-A-0 256 427. Additionally, DE-A-35 42 441 discloses bisphosphoric monoesters of block copolymers and their salts. Also described is their possible use as dispersant and emulsifier, more particularly for the preparation of crop protection formulations. U.S. Pat. No. 4,872,916 describes the use of phosphoric esters based on alkylene oxides of linear or branched aliphatics as pigment dispersants. Outlined in the same way in U.S. Pat. No. 3,874,891 is the use of corresponding sulfates. The documents U.S. Pat. No. 5,130,463 and U.S. Pat. No. 5,151,218 report on phosphoric esters based on hydroxy-terminated polyaddition products and polycondensation products, respectively, which find use for the production of highly filled polyester molding compounds, especially for SMC and BMC formulations (SMC=sheet molding compounds; BMC=bulk molding compounds). Bifunctional phosphoric esters, prepared via the Mannich-Moedritzer reaction, and their adsorption characteristics on calcium carbonate are described by J. Appl. Polym. Sci. 65, 2545 (1997). Subject matter described by U.S. Pat. No. 4,456,486 includes acidic or neutral phosphoric esters of fatty alcohols and alkoxylated fatty alcohols as agents for treating certain blue pigments. In a similar way, EP-A-0 256 427 describes the use of phosphoric esters of alkoxylated fatty alcohols for preparing pigment dispersions which are said to be suitable for aqueous applications. U.S. Pat. No. 4,720,514 describes pigment dispersions prepared using phosphoric esters of alkoxylates of different structures. U.S. Pat. No. 4,698,099 describes pigment dispersions comprising as their dispersants phosphoric esters of monohydroxy-terminated polyesters.

DE-A-39 30 687 describes phosphoric esters $(OH)_{3-n}PO$—$(OR)_n$ and their salts which are characterized in that R represents an aliphatic, cycloaliphatic and/or aromatic radical without Zerewitinoff hydrogen that contains at least one ether oxygen atom (—O—) and at least one carboxylic acid moiety (—COO—) and/or urethane group (—NHCOO—) and has an average molecular weight of 200 to 10 000, it being possible for some of the hydrogen atoms of the aliphatic groups to have been replaced by halogen atoms; the ratio of the number of carboxylic ester groups and/or urethane groups in the molecule (or in each group R) is in the range from 1:20 to 20:1, and n stands for 1 or 2. Also specified, more particularly, is the use of these phosphoric esters as dispersants.

The use of such phosphoric esters for preparing emulsion polymers is also known, particular emphasis being placed on the ready pigmentability of such emulsion polymers, including emulsion polymers with low coagulum content in particular (DE-A-198 10 658, JP-A-11-246799, and WO 99/46337).

DE-A-198 06 964 describes particular phosphoric esters based on polystyrene-block-polyalkylene oxide copolymers which are prepared starting from a monofunctional starter alcohol by sequential addition of styrene oxide and an alkylene oxide. Characteristics of these phosphoric esters include the use of at least 2 mol of styrene oxide for their preparation.

Likewise described is the use of these phosphoric esters as dispersants for pigments and fillers. DE-A-199 40 797 describes the use of nonionic, block copolymeric, styrene oxide-containing polyalkylene oxides as low-foam pigment wetting agents, the characteristics of the block copolymers including the use for their preparation of less than 2 mol of styrene oxide.

The known phosphoric esters have the disadvantage that in general they cannot be used universally, since there is frequently a lack of sufficient compatibility between dispersing additive and binder or between dispersing additive and surrounding medium (aqueous or solvent-borne formulations). A large part is played, too, by the chemical structure of the phosphoric esters: in aqueous formulations it is preferred to use only those phosphoric esters which have no additional hydrolyzable functional groups, such as ester groups or urethane groups, in the molecule. Frequently, high levels of addition of dispersing additives are needed in order to suppress the incidence of agglomerates; the degrees of filling which can be achieved are unsatisfactorily low; the stability of the dispersions and hence the consistency of their viscosity is often inadequate; flocculation and aggregation cannot always be avoided—accordingly, there may be visible separation and also flow defects and surface defects.

Applications of block copolymers containing styrene oxide in the paint and printing ink industry are removing some of these disadvantages. Known copolymers include (DE-A-198 06 964) polystyrene oxide-block-polyalkylene oxide copolymers which, starting from a monofunctional starter alcohol, are reacted by sequential addition of at least 2 mol of styrene oxide and an alkylene oxide, and subsequent phosphorylation to form the corresponding phosphoric esters.

As comprehensive findings of our own have demonstrated, a feature common to these products is a certain residual free styrene oxide content. Styrene oxide can induce health damage. In continuation of the debate around the toxicological and environmental risks posed by chemical products, therefore, the development and provision of products free from styrene oxide is vital.

It was the object of the present invention, therefore, to eliminate one or more of the disadvantages of the prior art. A particular object of the present invention was to provide dispersants for solids which exhibit an improved dispersing performance on a broad basis, and have a positive influence on the viscosity and rheological characteristics of formulations which comprise solids.

Surprisingly it has now been found that the aforementioned object is achieved by means of new dispersing resins for solids which are obtainable by a process which comprises the partial or complete reaction of the hydroxyl groups of carbonyl-hydrogenated ketone-aldehyde resins with one or more oxiranes and, if desired, subsequent complete or partial esterification with organic and/or inorganic acids.

In the reaction of carbonyl-hydrogenated ketone-aldehyde resins with one or more oxirane compounds, in accordance with the invention, it is preferred to use oxirane compounds of the general formula (I)

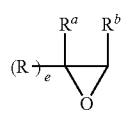

in which
R can be an optionally substituted, optionally heteroatom-containing aliphatic, cycloaliphatic, aromatic or araliphatic hydrocarbon radical, preferably an alkyl radical having 1 to 10 C atoms, or hydrogen, and $R^a$ and $R^b$ can be alike or different and can be hydrogen or alkyl radicals which may also, together with the two oxirane carbon atoms, form a 5- to 8-membered, more particularly a 6-membered, ring, and e can be =0 or 1, and optionally subsequent complete or partial esterification with organic and/or inorganic acids.

The invention further provides compounds of the general formula (II)

in which
K is a carbonyl-hydrogenated ketone-formaldehyde resin and
X is a hydrogen atom or
the radical $Y=[(C_lH_{2l}O)_a—(C_mH_{2m}O)_b—(C_nH_{2n}O)_c—(SO)_d—Z]$,
a, b and c independently of one another are values from 0 to 100, preferably 5 to 35, more particularly 10 to 20, with the proviso that the sum of a+b+c is >0,
d is =0 to 10, preferably <5, more particularly 0,
l, m and n independently of one another are 2 to 14, preferably 2 to 4,
w is 2 to 15, preferably 3 to 12, more particularly 4 to 12,
SO is =styrene oxide, and
Z is hydrogen and/or a radical selected from the group consisting of sulfonic acids, sulfuric acids, phosphonic acids, phosphoric acids, carboxylic acids, isocyanates, and epoxides, more particularly of phosphoric acid and (meth)acrylic acid, with the proviso that the radical Y is present at least once in the molecule.

Preferred compounds of the general formula (II) according to the invention are those in which Z is the radical of monoesterified and/or diesterified phosphoric acid.

The skilled worker is well aware that the compounds may be present in the form of a mixture with a distribution governed substantially by statistical laws. This applies not only to the distribution of the oxirane radicals but also the acid radicals and their degree of esterification, i.e., monoesters, diesters, and triesters, it being possible for the ester bonds to be intermolecular and/or intramolecular. In one particular embodiment the oxirane radicals may also be arranged in blocks.

The invention further provides for the use of the above reaction products, more particularly of the compounds of the general formula (II), as dispersants for solids, more particularly for producing binder-containing and binder-free pigment pastes, coating materials, printing inks, and print varnishes.

Further provided by the invention are dispersions of solids in liquid media, comprising at least one compound of the above reaction products and/or of the compounds of the general formula (II).

Additional subject matter of the invention is characterized by the claims.

Carbonyl-hydrogenated ketone-aldehyde resins which can be used in the reaction are all known resins.

Ketone-formaldehyde resins have already been known for a long time. Processes for the preparation are described, for example, in DE 33 24 287, U.S. Pat. No. 2,540,885, U.S. Pat. No. 2,540,886, DE 11 55 909, DD 12 433, DE 13 00 256, and DE 12 56 898.

Normally, for the preparation, ketones and formaldehyde are reacted with one another in the presence of bases.

Ketone-aldehyde resins are used in coating materials as, for example, film-forming additive components in order to improve certain properties such as rate of initial drying, gloss, hardness or scratch resistance. On account of their relatively low molecular weight, typical ketone-aldehyde resins possess a low melt viscosity and solution viscosity and therefore serve, among other things, as film-forming functional fillers in coating materials.

Through irradiation with, for example, sunlight, the carbonyl groups of the ketone-aldehyde resins are subject to conventional degradation reactions, such as those of Norrish type I or II [Laue, Plagens, Namen- and Schlagwort-Reaktionen, Teubner Studienbücher, Stuttgart, 1995].

It is therefore not possible to use unmodified ketone-aldehyde resins or ketone resins for high-quality applications in the exterior sector, for example, where high resistance properties, more particularly in respect of weathering and heat, are required. These disadvantages can be remedied by hydrogenating the carbonyl groups. The conversion of the carbonyl groups into secondary alcohols by hydrogenation of ketone-aldehyde resins has been practiced for a long time (DE 826 974, DE 870 022, JP 11-012338, U.S. Pat. No. 6,222,009).

The preparation of carbonyl-hydrogenated and ring-hydrogenated ketone-aldehyde resins on the basis of ketones which contain aromatic groups is likewise possible. Resins of this kind are described in DE 33 34 631.

There is no document, however, which describes the alkoxylation of carbonyl-hydrogenated ketone-aldehyde resins.

Particularly preferred in accordance with the invention are carbonyl-hydrogenated ketone-aldehyde resins based on formaldehyde which contain substantially the structural elements of formulae (III-a) to (III-c)

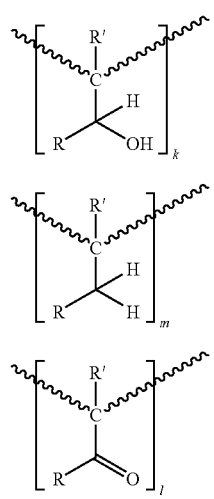

Where
R is an aromatic hydrocarbon radical having 6-14 carbon atoms or a (cyclo-)aliphatic hydrocarbon radical having 1-12 carbon atoms,
R'=H or $CH_2OH$,
k=2 to 15, preferably 3 to 12, more preferably 4 to 12,
m=0 to 13, preferably 0 to 9,
l=0 to 2,
the sum of k+l+m being between 5 and 15 and k being >m, preferably between 5 and 12, the three structural elements being able to be distributed in alternation or randomly, and the structural elements being linked linearly via $CH_2$ groups and/ or with branching via CH groups, obtained by
A) preparing the base resins by condensing at least one ketone with at least one aldehyde in the presence of at least one basic catalyst and, if desired, of at least one phase transfer catalyst, solventlessly or using a water-miscible organic solvent,
and subsequently
B) subjecting the carbonyl groups of the ketone-aldehyde resins obtained in A) to continuous, semibatchwise or batchwise hydrogenation in the melt or in solution in a suitable solvent with hydrogen in the presence of a catalyst at pressures between 50 and 350 bar, preferably between 100 and 300 bar, more preferably between 150 and 300 bar, and at temperatures between 40 and 140° C., preferably between 50 and 140° C.

These compounds and also the process for preparing them are subject matter of patent application DE 10 2006 009 079.9, unpublished at the priority date of the present specification, and which is hereby introduced as a reference.

Inventively preferred, moreover, are carbonyl-hydrogenated ketone-aldehyde resins based on bi-reactive ketones and formaldehyde which contain substantially structural elements of the formula (IV)

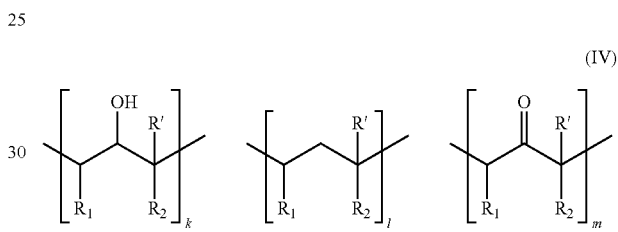

with
R'=H, aliphatic hydrocarbon radical with 1 to 12 carbon atoms or $CH_2OH$,
$R_1$ and $R_2$=H, aliphatic and/or cycloaliphatic hydrocarbon radical having 1 to 18 carbon atoms,
where
$R_1$ and $R_2$ may be alike or different or may be part of a joint cycloaliphatic ring,
k=1 to 15, preferably 2 to 12, more preferably 3 to 12,
l=1 to 13, preferably 1 to 9,
m=0 to 2,
the sum of k+l+m being between 3 and 15, preferably between 4 and 12, and it being possible for the three structural elements to be distributed in alternation or randomly, and it being possible for the structural elements to be linked linearly via $CH_2$ groups and it being possible, in the case where $R_1$ and/or $R_2$=H, for the structural elements also to be linked with branching via $CH_2$ groups,
obtained by
A) preparing the base resins by condensing at least one ketone with at least one aldehyde in the presence of at least one basic catalyst and, if desired, of at least one phase transfer catalyst, solventlessly or using a water-miscible organic solvent,
and subsequently
B) subjecting the carbonyl groups of the ketone-aldehyde resins (A) to continuous, semibatchwise or batchwise hydrogenation in the melt or in solution in a suitable solvent with hydrogen in the presence of a catalyst at pressures between 50 and 350 bar, preferably between 100 and 300 bar, more preferably between 150 and 300 bar, and at temperatures between 40 and 140° C., preferably between 50 and 140° C.

These compounds and also the process for preparing them are subject matter of patent application DE 10 2006 009 080.2, unpublished at the priority date of the present specification, and which is hereby introduced as a reference.

Examples of the alkylene oxides are one or more compounds selected from the group consisting of ethylene oxide, propylene oxide, butylene oxide, styrene oxide, dodecene oxide, tetradecene oxide, 2,3-dimethyloxirane, cyclopentene oxide, 1,2-epoxypentane, 2-isopropyloxirane, glycidyl methyl ether, glycidyl isopropyl ether, epichlorohydrin, 3-methoxy-2,2-dimethyloxirane, 8-oxabicyclo[5.1.0]octane, 2-pentyloxirane, 2-methyl-3-phenyloxirane, 2,3-epoxypropylbenzene, 2-(4-fluorophenyl)oxirane, and tetrahydrofuran, and also their pure enantiomer pairs or enantiomer mixtures.

Through the ratio of alkylene oxides to one another and to the resins K it is possible to codetermine properties such as, for example, hydrophilicity/hydrophobicity, melting range, viscosity, hardness, etc. The rules for this are familiar to the skilled worker in this field.

A solid for the purposes of the present invention may in principle be any solid organic or inorganic material.

Examples of such solids are pigments, fillers, dyes, optical brighteners, ceramic materials, magnetic materials, nanodisperse solids, metals, biocides, agrochemicals, and drugs which are employed in the form of dispersions.

Preferred solids are pigments as specified, for example, in the Colour Index, Third Edition, Volume 3; The Society of Dyers and Colourists (1982), and in the subsequent, revised editions.

Examples of pigments are inorganic pigments, such as carbon blacks, titanium dioxides, zinc oxides, Prussian blue, iron oxides, cadmium sulfides, chromium pigments, such as chromates, molybdates, and mixed chromates and sulfates of lead, zinc, barium, calcium, and mixtures thereof, for example. Further examples of inorganic pigments are given in the book by H. Endriss, Aktuelle anorganische Bunt-Pigmente, Vincentz Verlag, Hanover (1997).

Examples of organic pigments are those from the group of the azo, disazo, condensed azo, Naphtol, metal complex, thio indigo, indanthrone, isoindanthrone, anthanthrone, anthraquinone, isodibenzanthrone, triphendioxazine, quinacridone, perylene, diketopyrrolopyrrole, and phthalocyanine pigments. Further examples of organic pigments are given in the book by W. Herbst, K. Hunger, Industrial Organic Pigments, VCH, Weinheim (1993).

Further preferred solids are fillers, such as talc, kaolin, silicas, barites, and lime; ceramic materials, such as aluminum oxides, silicates, zirconium oxides, titanium oxides, boron nitrides, silicon nitrides, boron carbides, mixed silicon/aluminum nitrides and metal titanates, for example; magnetic materials, such as magnetic oxides of transition metals, such as iron oxides, cobalt-doped iron oxides, and ferrites, for example; metals, such as iron, nickel, cobalt, and their alloys, for example; and biocides, agrochemicals, and drugs, such as fungicides, for example.

Pigment pastes, coating materials, printing inks and/or print varnishes for the purposes of the present invention may be any of a very wide variety of products. They may, for example, be systems comprising fillers, pigments and/or dyes. As a liquid medium they may comprise organic solvents and/or water, as is known, as state of the art, as a function of the binders used. In addition it is also possible to regard binder components, such as polyols, for example, as being liquid media.

The coating materials, printing inks and/or print varnishes need not, however, necessarily contain a liquid phase, but instead may also be what are known as powder coating materials.

The coating materials, printing inks and/or print varnishes may also comprise the typical state-of-the-art additives, such as, for example, wetting agents, flow control agents or defoamers, etc., and may cure, crosslink and/or dry by a variety of methods in accordance with the prior art.

Examples of coating materials for the purposes of the present invention are paints, varnishes, printing inks, and other coating materials, such as solvent-borne and solvent-free coating materials, powder coating materials, UV-curable coating materials, low-solids, medium-solids, and high-solids, automobile finishes, wood varnishes, baking varnishes, 2K [two-component] coating materials, metal coating materials, and toner compositions. Further examples of coating materials are given in Bodo Müller, Ulrich Poth, Lackformulierung und Lackrezeptur, Lehrbuch für Ausbildung und Praxis, Vincentz Verlag, Hanover (2003) and in P. G. Garrat, Strahlenhärtung, Vincentz Verlag, Hanover (1996).

Examples of printing inks and/or print varnishes for the purposes of the present invention are solvent-based printing inks, flexographic inks, gravure inks, letterpress or relief inks, offset inks, lithographic inks, printing inks for printing packaging, screen printing inks, inks for ink-jet printers, ink-jet ink, and print varnishes, such as overprint varnishes.

Further examples of printing ink formulations and/or print varnish formulations are given in E. W. Flick, Printing Ink and Overprint Varnish Formulations—Recent Developments, Noyes Publications, Park Ridge N.J., (1990), and subsequent editions.

The dispersing resins of the invention can be used in pigment pastes, coating materials, printing inks and/or print varnishes at a concentration of 0.01% to 90.0%, preferably of 0.5% to 35%, and more preferably of 1% to 25% by weight. Where appropriate they can be used in a mixture with wetting agents and dispersants of the prior art.

WORKING EXAMPLES

The invention is illustrated in greater detail below with reference to working examples.
Reactants:
Carbonyl-Hydrogenated Ketone-Aldehyde Resins The carbonyl-hydrogenated ketone-aldehyde resins were prepared as follows.
Preparation of a Base Resin for Further Hydrogenation, Based on Acetophenone and Formaldehyde 1200 g of acetophenone, 220 g of methanol, 0.3 g of benzyltributylammonium chloride, and 360 g of a 30% strength aqueous formaldehyde solution are charged to a vessel and homogenized with stirring. Then, with stirring, 32 g of a 25% strength aqueous sodium hydroxide solution are added. Then, with stirring, at 80 to 85° C., 655 g of a 30% strength aqueous formaldehyde solution are added over 90 minutes. After 5 hours of stirring at reflux temperature, the stirrer is shut off and the aqueous phase is separated from the resin phase. The crude product is washed with water to which acetic acid has been added, washing continuing until a melt sample of the resin appears clear. At that point the resin is dried by distillation.

This gives 1270 g of a pale yellowish resin. The resin is clear and brittle and possesses a melting point of 72° C. The Gardner color number is 0.8 (50% in ethyl acetate). It is soluble, for example, in acetates such as butyl acetate and ethyl acetate, and in aromatics such as toluene and xylene. It is insoluble in ethanol. The formaldehyde content is 35 ppm. This product is termed a base resin.

Hydrogenation of the base resin based on acetophenone and formaldehyde

Carbonyl-Hydrogenated Ketone-Aldehyde Resin I:

300 g of the base resin are dissolved in 700 g of iso-butanol with heating. Then hydrogenation takes place at 260 bar and 120° C. in an autoclave (from Parr) with a catalyst basket filled with 100 ml of a Raney-type nickel catalyst. After 8 hours the reaction mixture is drained from the reactor through a filter.

Carbonyl-Hydrogenated Ketone-Aldehyde Resin II:

300 g of the base resin are dissolved in 700 g of tetrahydrofuran (water content about 7%). Then hydrogenation takes place at 260 bar and 120° C. in an autoclave (from Parr) with a catalyst basket filled with 100 ml of a commercially customary Ru catalyst (3% Ru on aluminum oxide). After 20 hours the reaction mixture is drained from the reactor through a filter.

Carbonyl-Hydrogenated Ketone-Aldehyde Resin III:

The base resin was dissolved in isobutanol with heating to give a 30% strength solution. Hydrogenation takes place in a continuously operated fixed-bed reactor packed with 400 ml of a commercially customary copper/chromium catalyst supported on silica. At 300 bar and 130° C., 500 ml/h of the reaction mixture are passed from top to bottom through the reactor (trickle mode). The pressure is kept constant by additional supply of hydrogen.

The carbonyl-hydrogenated ketone-aldehyde resin solutions from examples I to III are freed from the solvent in vacuo. This gives the corresponding carbonyl-hydrogenated ketone-aldehyde resins I-III.

Reaction of carbonyl-hydrogenated ketone-aldehyde resins with one or more alkylene oxides and, if desired, complete or partial esterification with phosphoric acid The polyethers of the invention were prepared as detailed in DE 100 29 648. The resulting modified polyethers have a general structural formula $$[U-(SO)_e(EO)_f(PO)_g(BO)_h]_iP(O)(OH)_{3-i}$$

in which
U=carbonyl-hydrogenated ketone-aldehyde resin,
SO=—CH$_2$—CH(Ph)—O— with Ph=phenyl radical,
EO=ethylene oxide,
PO=propylene oxide,
BO=butylene oxide.

TABLE 1

| Example | Carbonyl-hydrogenated ketone-aldehyde resin No.: | e | f | g | h | i |
|---|---|---|---|---|---|---|
| A1 | I | 4 | 4 | 4 | 0 | 3.0 |
| A2 | II | 0 | 20 | 0 | 0 | 0.7 |
| A3 | III | 1 | 9 | 0 | 0 | 1.0 |
| A4 | I | 3 | 0 | 0 | 2 | 1.0 |
| A5 | II | 2 | 0 | 4 | 0 | 3.0 |
| A6 | III | 0 | 9 | 0 | 0 | 3.0 |
| A7 | I | 4 | 4 | 4 | 0 | 0.3 |
| A8 | II | 1 | 5 | 0 | 0 | 1.0 |
| A9 | III | 1 | 9 | 0 | 0 | 1.0 |
| A10 | I | 3 | 0 | 0 | 2 | 2.5 |
| A11 | II | 2 | 0 | 4 | 0 | 1.0 |
| A12 | III | 0 | 9 | 0 | 0 | 0.5 |
| A13 | I | 4 | 4 | 4 | 0 | 1.0 |
| A14 | II | 0 | 20 | 0 | 0 | 0.9 |
| A15 | III | 3 | 0 | 0 | 2 | 0.9 |
| A16 | II | 0 | 10 | 0 | 0 | 0.9 |

TABLE 1-continued

| Example | Carbonyl-hydrogenated ketone-aldehyde resin No.: | e | f | g | h | i |
|---|---|---|---|---|---|---|
| A17 | II | 0 | 9 | 0 | 0 | 3.0 |
| A18 | III | 4 | 4 | 4 | 0 | 1.0 |
| A19 | I | 1 | 5 | 0 | 0 | 1.0 |
| A20 | II | 1 | 9 | 0 | 0 | 1.0 |
| A21 | III | 3 | 0 | 0 | 2 | 2.5 |

The sequence set out above for the monomeric alkylene oxides does not represent any restriction as to the resulting polyether structures, but instead represents an exemplary listing, it being pointed out expressly at this point that, using the abovementioned monomers, polyethers may be constructed both randomly and blockwise. The skilled worker is aware that the modified or unmodified polyethers have been prepared by means of a phosphorylation reaction and that that reaction proceeds randomly. The value i represents the molar ratio of polyether to phosphate groups. The value i can vary between 0 and 2.9.

APPLICATION EXAMPLES

As comparative examples, use was made of a fatty acid ethoxylate B1 (Tego Dispers 740W, Tego), a nonylphenol ethoxylate B2 with 9 mol of ethylene oxide (Berol 09, Akzo), corresponding monophosphate derivative B3 (Berol® 733, Akzo), and an oleyl alcohol B4 ethoxylated with 10 mol of EO (Alkanol 010, Tego).

The procedure used for examining the activity of the compounds for inventive use as a dispersing additive, and also of the comparative compounds, was as follows:

Preparation of Pigment Pastes

To prepare the pigment pastes, the respective additives were mixed with water and, where appropriate, with antifoams and thereafter the pigments were added. Dispersing took place following the addition of grinding media (glass beads 2-3 mm, same volume as the pigment paste) for one hour (inorganic pigments) or two hours (organic pigments and carbon black) in a Skandex shaker with air cooling.

Formulation of Blue Pastes

The blue pastes were formulated as follows (amounts in % by weight):

45.9 water, 12.2 inventive compounds or comparative compound (based on 100% solids), 1.0 defoamer (Tego Foamex 830, Tego Chemie Service GmbH), 40.8 dye (Heliogenblau 7080, blue dye, BASF), 0.1 preservative (Bodoxin® AH, Bode-Chemie).

Formulation of Black Pastes

The black pastes were formulated as follows (amounts in % by weight):

56.9 water, 15.0 inventive compounds or comparative compound (based on 100% solids), 1.0 defoamer (Tego® Foamex 830, Tego Chemie Service GmbH), 0.1 preservative (Bodoxin® AH, Bode-Chemie), 27.0 pigment (Flammruß 101 lamp black, Degussa).

Formulation of Red Iron Oxide Pastes (Amounts in % by Weight):

25.8 water, 8.1 inventive compounds or comparative compound (based on 100% solids), 0.1 preservative (Bodoxin® AH, Bode-Chemie), 1.0 defoamer (Tego® Foamex 830, Tego Chemie Service GmbH), 65.0 red iron oxide (Bayferrox 140M, Bayer).

It was possible to carry out the preparation of the pigment pastes of the invention with a lower concentration of defoamer (0.8% rather than 1.0%), owing to the reduced foam stabilization in these cases.

Test Paints

Two commercially available white paints based on a straight-acrylate dispersion (Mowilith® DM771) and on a solvent-free long oil alkyd (Alkydal®F681, 75%) were used.

| White paint 1 (aqueous) | |
|---|---|
| Water | 3.8 |
| Additol ® XW330 | 0.3 (wetting agent, Vianova) |
| 2% strength aqueous solution of Tylose ® MH2000 K | 9.4 (thickener, Clariant) |
| 10% strength aqueous solution of Calgon ® N | 1.1 (wetting agent, Henkel) |
| Mergal ® K10N | 0.2 (preservative, Allied Signal) |
| China Clay B | 2.0 |
| Micro Talc ATl | 3.8 |
| Omyacarb ® GU | 16.8 (filler, Omya) |
| Kronos ® 2190 | 22.6 (titanium dioxide, Kronos) |
| Foamex ® 8030 | 0.4 (defoamer, Tego) |
| Mowilith ® DM771 | 37.5 (acrylate dispersion, Clariant) |
| Ammonia (25% strength) | 0.2 |
| White spirit | 1.1 |
| Butyl diglycol acetate | 0.8 |

| White paint 2 (solvent-based) | |
|---|---|
| Alkydal ® F681, 75% | 50.0 (long oil alkyd, Bayer) |
| Bayertitan ® R-KB-2 | 26.0 (titanium dioxide, Kerr McGee) |
| Octa Soligen ® Ca. 4 | 2.0 (dryer, Borchers) |
| Bentone 34, 10% digestion | 1.4 (10 parts Bentone 34, 10 parts Tego ®Dispers 700, 80 parts white spirit) |
| K60 | 18.0 (Kristalloel) |
| Octa Soligen ® cobalt 6 | 0.3 (Borchers) |
| Octa Soligen ® zirconium 18 | 2.0 (Borchers) |
| Ascinin ® R conc. | 0.3 (Byk) |

Tinted paints were produced by manually mixing color paste and white paint in the proportion of 1 g of color pigment to 25 g of white pigment.

Test of Paste Stabilities

To determine the paste stabilities, the achievable initial viscosities and also the viscosities after storage at 50° C. for four weeks were ascertained at two different shear rates (20 l/s and 1000 l/s).

| Blue pastes | | | | |
|---|---|---|---|---|
| Sample | Viscosity/Pas immediate at 20 l/s | Viscosity/Pas immediate at 1000 l/s | Viscosity/Pas after 4 weeks at 50° C. at 20 l/s | Viscosity/Pas after 4 weeks at 50° C. at 1000 l/s |
| A1 | 1308 | 150 | 1500 | 203 |
| A2 | 1150 | 130 | 1300 | 155 |
| A3 | 1201 | 134 | 1380 | 160 |
| A4 | 1106 | 120 | 1320 | 140 |
| A5 | 1200 | 125 | 1360 | 138 |
| A6 | 1170 | 140 | 1290 | 160 |
| A7 | 1413 | 200 | 1800 | 250 |
| B1 | 1108 | 150 | 1700 | 235 |
| B2 | 1723 | 135 | 2500 | 280 |
| B3 | 1306 | 130 | 190 | 190 |
| B4 | 2062 | 250 | 4000 | 390 |

| Black pastes | | | | |
|---|---|---|---|---|
| Sample | Viscosity/Pas immediate at 20 l/s | Viscosity/Pas immediate at 1000 l/s | Viscosity/Pas after 4 weeks at 50° C. at 20 l/s | Viscosity/Pas after 4 weeks at 50° C. at 1000 l/s |
| A1 | 400 | 120 | 420 | 140 |
| A2 | 360 | 100 | 380 | 130 |
| A3 | 365 | 110 | 380 | 120 |
| A4 | 350 | 100 | 385 | 120 |
| A5 | 310 | 108 | 340 | 393 |
| A6 | 405 | 120 | 420 | 140 |
| A7 | 401 | 130 | 509 | 200 |
| B1 | 400 | 130 | 508 | 180 |
| B2 | 500 | 120 | 680 | 980 |
| B3 | 420 | 130 | 740 | 182 |
| B4 | not preparable | | | |

| Iron oxide pastes | | | | |
|---|---|---|---|---|
| Sample | Viscosity/Pas immediate at 20 l/s | Viscosity/Pas immediate at 1000 l/s | Viscosity/Pas after 4 weeks at 50° C. at 20 l/s | Viscosity/Pas after 4 weeks at 50° C. at 1000 l/s |
| A1 | 790 | 320 | 1000 | 395 |
| A2 | 650 | 395 | 903 | 425 |
| A3 | 630 | 320 | 870 | 370 |
| A4 | 615 | 290 | 820 | 320 |
| A5 | 707 | 408 | 900 | 440 |
| A6 | 720 | 326 | 890 | 370 |
| A7 | 1100 | 500 | 1010 | 700 |
| B1 | 1304 | 450 | no stability | no stability |
| B2 | 1302 | 450 | no stability | no stability |
| B3 | 1800 | 900 | 4000 | 1300 |
| B4 | 900 | 160 | no stability | no stability |

The effective stability of the pigment pastes of the invention for all the types of pigment investigated was readily evident from the small increase in viscosity in each case, whereas only in isolated cases did the comparative examples permit the preparation of stable pigment preparations.

Test of Dispersing Properties

Drawdown of the test formulations with 200 μm wet film thickness; after 5 minutes of drying, rub-out test on ⅓ of the surface. Colorimetric measurement of the drawdowns using an XP 68 spectrophotometer from X-Rite.

| \multicolumn{3}{c}{Emulsion paint based on Mowilith ® DM771/blue} |
| Sample | Colorimetric values L and b | | Delta E after rub-out |
| --- | --- | --- | --- |
| A1 | 65.5 | −31.6 | 2.2 |
| A2 | 65.2 | −32.1 | 2.4 |
| A3 | 64.7 | −32.3 | 1.9 |
| A4 | 65.0 | −32.0 | 2.0 |
| A5 | 64.6 | −32.5 | 1.8 |
| A6 | 65.3 | −31.9 | 1.9 |
| A7 | 65.4 | −31.0 | 3.5 |
| B1 | 63.7 | −33.9 | 0.9 |
| B2 | 65.6 | −30.6 | 4.3 |
| B3 | 65.2 | −32.0 | 3.9 |
| B4 | 63.9 | −31.5 | 5.7 |

| Emulsion paint based on Mowilith ® DM771/red | | | |
| Sample | Colorimetric values L, a and b | | | Delta E after rub-out |
| --- | --- | --- | --- | --- |
| A1 | 75.8 | 13.3 | 4.5 | 0.4 |
| A2 | 75.9 | 13.1 | 4.3 | 0.4 |
| A3 | 75.8 | 13.4 | 4.2 | 0.5 |
| A4 | 75.5 | 13.6 | 4.5 | 0.3 |
| A3 | 75.6 | 13.5 | 4.6 | 0.4 |
| A6 | 75.7 | 13.4 | 4.5 | 0.3 |
| A7 | 74.8 | 13.2 | 4.0 | 1.3 |
| B1 | 75.0 | 13.0 | 4.1 | 0.9 |
| B2 | 74.9 | 13.1 | 4.1 | 1.2 |
| B3 | 75.5 | 13.2 | 4.2 | 0.7 |
| B4 | 75.2 | 12.9 | 4.7 | 0.9 |

| Emulsion paint based on Mowilith ® DM771/gray | | |
| Sample | Colorimetric values L and b | | Delta E after rub-out |
| --- | --- | --- | --- |
| A1 | 60.3 | 4.5 | 0.3 |
| A2 | 60.4 | 4.4 | 0.2 |
| A3 | 60.4 | 4.4 | 0.3 |
| A4 | 60.6 | 4.5 | 0.3 |
| A5 | 60.5 | 4.3 | 0.3 |
| A6 | 60.2 | 4.4 | 0.1 |
| A7 | 61.1 | 4.4 | 1.4 |
| B1 | 59.1 | 4.4 | 0.5 |
| B2 | 60.3 | 4.5 | 1.2 |
| B3 | 62.3 | 4.3 | 2.4 |
| B4 | not applicable | | not applicable |

| Alkyd paint based on Alkydal ® F681/blue | | |
| Sample | Colorimetric values L and b | | Delta E after rub-out |
| --- | --- | --- | --- |
| A1 | 68.0 | −29.9 | 1.5 |
| A2 | 68.2 | −29.7 | 1.5 |
| A3 | 66.7 | −30.8 | 1.5 |
| A4 | 67.3 | −29.9 | 1.5 |
| A3 | 68.0 | −29.5 | 1.5 |
| A6 | 67.8 | −30.1 | 1.5 |
| A7 | 66.5 | −28.7 | 1.5 |
| B1 | 88.0 | −4.0 | 24.7 |
| B2 | 67.5 | −29.2 | 4.2 |
| B3 | 68.8 | −28.4 | 4.1 |
| B4 | 66.3 | −28.6 | 3.1 |

| Alkyd paint based on Alkydal ® F681/red | | | |
| Sample | Colorimetric values L, a and b | | | Delta E after rub-out |
| --- | --- | --- | --- | --- |
| A1 | 76.8 | 12.3 | 2.7 | 0.4 |
| A2 | 75.9 | 12.0 | 2.6 | 0.3 |
| A3 | 75.8 | 12.1 | 2.8 | 0.4 |
| A4 | 75.5 | 12.2 | 2.7 | 0.2 |
| A3 | 75.6 | 11.9 | 2.6 | 0.6 |
| A6 | 75.7 | 11.1 | 2.7 | 0.3 |
| A7 | 74.8 | 7.9 | 1.8 | 3.9 |
| B1 | 82.0 | 8.0 | 0.9 | 2.7 |
| B2 | 87.9 | 2.9 | 0.1 | 11.5 |
| B3 | 79.5 | 9.2 | 1.3 | 4.8 |
| B4 | 78.2 | 7.9 | 1.5 | 5.0 |

| Alkyd paint based on Alkydal F681/gray | | |
| Sample | Colorimetric values L and b | | Delta E after rub-out |
| --- | --- | --- | --- |
| A1 | 62.1 | 6.0 | 0.4 |
| A2 | 62.8 | 6.3 | 0.3 |
| A3 | 62.1 | 5.8 | 0.5 |
| A4 | 62.3 | 6.1 | 0.3 |
| A3 | 62.7 | 6.7 | 0.4 |
| A6 | 62.7 | 6.0 | 0.6 |
| A7 | 62.9 | 6.0 | 0.4 |
| B1 | 82.3 | 4.2 | 8.3 |
| B2 | 63.1 | 6.3 | 1.7 |
| B3 | 63.3 | 6.4 | 1.2 |
| B4 | 64.1 | 6.5 | 1.8 |

In evidence were the favorable development of color strength that could be achieved, and also the rub-out test, which was favorable in all cases, owing to the dispersing additives of the invention.

This was also the case in particular, markedly so, in comparison to the comparative examples, which only in isolated cases gave good developments of color strength. Particularly marked was the superiority of the compounds of the invention for inventive use, on the basis of the excellent delta E rub-out values for all types of pigment in both water-based and solvent-based systems.

Another feature deserving of particular emphasis is the markedly improved redispersibility of portions of preparation which have dried up or started to dry up. Moreover they possess a very low tendency to start to dry up or dry out. Viscosity, flow characteristics, and the necessary prerequisites for excellent metering possibilities, accordingly, are markedly improved as a result. The pigment preparations of the invention possess a very high color strength and brightness. High pigment concentrations can be achieved. The pigment concentrates were preparable without great grinding effort; both of these factors are associated with large economic advantages.

Use Example for the Preparation of Emulsion Polymers

The emulsifier A2 was dissolved in water and adjusted to a pH of 9 using ammonia.

Initial Charge:
1.5 g emulsifier A2, 250 g water,
36 g portion of feed stream 1 (feed stream 1: 8.5 g of emulsifier A2, 200 g of water, 15 g of acrylamide (50% strength in water), 12.5 g of acrylic acid, 242 g of styrene, 237 g of n-butyl acrylate),
5 g portion of feed stream 2 (feed stream 2: 2.5 g of Na peroxodisulfate, 98 g of water).

The initial charge in a polymerization vessel equipped with an anchor stirrer, reflux condenser, and 2 feed vessels was heated under a nitrogen atmosphere to a temperature of 85° C. and initially polymerized for 15 minutes. Then feed stream 1 was metered in over 2 hours and feed stream 2 over 2.5 hours. This was followed by polymerization for 1 hour more. The product was then filtered through a sieve of mesh size 500 μm, and the coagulum fraction in the wet state was found by weighing to be <0.1%. The solids content of the dispersion was 48% at a viscosity of 130 mPas.

The use of these compounds of the invention for emulsion polymerization is especially advantageous when the binders are used to formulate paints, since these emulsifiers permit high pigment concentrations in the dispersion, and the pigment binding power of the polymer is therefore large, which again—as the skilled worker is well aware—leads to higher wet abrasion resistances.

What is claimed is:

1. A dispersing resin for solids which is obtained through the partial or complete reaction of hydroxyl groups of carbonyl-hydrogenated ketone-aldehyde resins with one or more oxiranes and, if desired, subsequent complete or partial esterification with organic and/or inorganic acids, wherein during the preparation process one or more oxirane compounds of general formula (I)

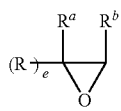

(I)

are used in which
R is an aliphatic, cycloaliphatic, aromatic or araliphatic hydrocarbon radical or hydrogen, and
$R^a$ and $R^b$ are alike or different and are hydrogen or alkyl radicals which may also, together with the two oxirane carbon atoms, form a 5- to 8-membered ring, and
e is=0 or 1.

2. The dispersing resin as claimed in claim 1, wherein R is an alkyl radical having 1 to 10 C atoms.

3. The dispersing resin as claimed in claim 1, wherein $R^a$ and $R^b$ are alkyl radicals which, together with the two oxirane carbon atoms, form a 6-membered ring.

4. A dispersion of solids in a liquid medium, comprising at least one dispersing resin which is obtained through the partial or complete reaction of hydroxyl groups of carbonyl-hydrogenated ketone-aldehyde resins with one or more oxiranes and, if desired, subsequent complete or partial esterification with organic and/or inorganic acids, wherein during the preparation process one or more oxirane compounds of general formula (I)

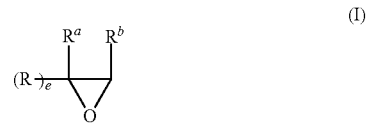

(I)

are used in which
R is an aliphatic, cycloaliphatic, aromatic or araliphatic hydrocarbon radical or hydrogen, and
$R^a$ and $R^b$ are alike or different and are hydrogen or alkyl radicals which may also, together with the two oxirane carbon atoms, form a 5- to 8-membered ring, and
e is=0 or 1.

5. A dispersing resin of general formula (II)

$$K-(OX)_w \quad (II)$$

in which
K is a carbonyl-hydrogenated ketone-formaldehyde resin and
X is a hydrogen atom or
the radical $Y=[(C_lH_{2l}O)_a-(C_mH_{2m}-O)_b-(C_nH_{2n}O)_c-(SO)_d-Z]$,
a, b and c independently of one another are values from 0 to 100, with the proviso that the sum of a+b+c is >0,
d=0 to 10,
l, m and n independently of one another are ≧2 to 14,
w=2 to 15,
SO=styrene oxide, and
Z is hydrogen and/or a radical selected from the group consisting of sulfonic acids, sulfuric acids, phosphonic acids, phosphoric acids, carboxylic acids, isocyanates, and epoxides,
with the proviso that the radical Y is present at least once in the molecule.

6. The dispersing resin as claimed in claim 5, wherein a, b and c independently of one another adopt the values 5 to 35.

7. The dispersing resin as claimed in claim 5, wherein d is <5.

8. The dispersing resin as claimed in claim 5, wherein d is 0.

9. The dispersing resin as claimed in claim 5, wherein l, m and n independently of one another are 2 to 4.

10. The dispersing resin as claimed in claim 5, wherein w is 3 to 12.

11. The dispersing resin as claimed in claim 5, wherein Z is selected from the group consisting of phosphoric acid and (meth)acrylic acid.

12. The dispersing resin as claimed in claim 5, wherein Z is the radical of monoesterified or diesterified phosphoric acid.

* * * * *